United States Patent [19]
Sack

[11] Patent Number: 5,687,985
[45] Date of Patent: Nov. 18, 1997

[54] STROLLER, RECLINING AND CANOPY TENSIONING MECHANISMS THEREOF

[75] Inventor: James Sack, Elverson, Pa.

[73] Assignee: Graco Children's Products, Inc., Elverson, Pa.

[21] Appl. No.: 334,086

[22] Filed: Nov. 4, 1994

[51] Int. Cl.[6] ........................................ B62B 7/08
[52] U.S. Cl. ........................ 280/650; 280/47.4; 297/364
[58] Field of Search ........................... 297/364, 369; 280/642, 650, 47.371, 47.38, 47.4, 647

[56] References Cited

U.S. PATENT DOCUMENTS

| | | | |
|---|---|---|---|
| 2,783,053 | 2/1957 | Sheldrick et al. | 280/47.4 X |
| 2,966,365 | 12/1960 | Kortum | 280/47.371 |
| 3,277,601 | 10/1966 | Ryan . | |
| 3,533,648 | 10/1970 | Thieberger . | |
| 4,415,180 | 11/1983 | Payne, Jr. . | |
| 4,736,959 | 4/1988 | Steenburg | 280/47.4 X |
| 4,805,928 | 2/1989 | Nakao et al. . | |
| 4,809,724 | 3/1989 | Fuser . | |
| 4,858,947 | 8/1989 | Yee et al. . | |
| 4,886,289 | 12/1989 | Yee et al. | 280/47.4 X |
| 4,907,818 | 3/1990 | Chai | 280/650 X |
| 5,018,754 | 5/1991 | Cheng | 280/47.4 |
| 5,039,118 | 8/1991 | Huang . | |
| 5,056,805 | 10/1991 | Wang . | |
| 5,062,179 | 11/1991 | Huang . | |
| 5,087,066 | 2/1992 | Mong-Hsing . | |
| 5,143,398 | 9/1992 | Teng | 280/650 X |
| 5,167,425 | 12/1992 | Chen | 280/47.4 X |
| 5,168,601 | 12/1992 | Liu . | |
| 5,184,835 | 2/1993 | Huang . | |
| 5,190,390 | 3/1993 | Ming-Tai . | |
| 5,221,106 | 6/1993 | Shamie | 280/47.4 X |
| 5,244,228 | 9/1993 | Chiu . | |
| 5,257,799 | 11/1993 | Cone et al. . | |

FOREIGN PATENT DOCUMENTS

2076300  4/1984  United Kingdom .

Primary Examiner—Kevin Hurley
Assistant Examiner—Michael Mar
Attorney, Agent, or Firm—Morgan, Lewis and Bockius LLP

[57] ABSTRACT

The present invention relates to a stroller, in particularly a tandem seat stroller, and a unique canopy mechanism and a unique reclining mechanism for use in the stroller according to the present invention. The stroller comprises a main frame having a first seat support for supporting a first seat and a first reclinable backrest frame for supporting a first backrest. A first reclining mechanism is connected to the backrest frame and the main frame for selectively pivotally moving the backrest relative to the main frame, which includes at least one pivot mechanism. A first canopy mechanism is also connected to the main frame which includes a first tensioning mechanism, a first canopy frame connected to one end of a canopy and a second canopy frame connected to the other end of the canopy.

19 Claims, 8 Drawing Sheets

STROLLER, RECLINING AND CANOPY TENSIONING MECHANISMS THEREOF

BACKGROUND

Strollers can incorporate a reclining mechanism for tilting the backrest as disclosed for example in U.S. Pat. No. 4,805,928 issued to Nakao et al.; U.S. Pat. No. 5,087,066 to Mong-Hsing; U.S. Pat. No. 5,257,799 to Cone et al. These reclining mechanisms are rather complex to operate and do not provide the flexibility necessary for use in a tandem stroller where two seats are included. It is desirable to provide a simple easy to operate reclining mechanism that has a plurality of reclining positions.

A stroller can also include a canopy folding mechanism for enabling the canopy to be opened and closed as disclosed, for instance, in U.S. Pat. No. 5,190,390 issued to Ming-Tai. Specifically, the '390 patent discloses engaging teeth and indents arranged on exterior and interior peripheries of the two mating portions of the canopy folding mechanism to restrain the canopy support in a fixed position. Other ratcheting mechanisms similar to the ones disclosed in the '390 patent are described in U.S. Pat. No. 5,056,805 issued to Wang; U.S. Pat. Nos. 5,062,179 and 5,184,835 to Huang; and U.S. Pat. No. 5,168,601 to Liu.

The canopy in a stroller is generally either in a closed position or in a fully extended open position. However, the canopy mechanism of the type described in the '390 patent typically uses a frictional ratcheting mechanism which has a plurality of positively engaging positions. To move from a completely folded position to a completely extended position, it has to move through many of those positively engaging positions. In this regard, it desirable to move from a folded position to a fully extended position by passing only a single positively engaging position.

Moreover, it is desirable to maintain the canopy in the fully extended position with some tension to remove any slack or sag. This not only makes the stroller more aesthetically appealing, it prevents the canopy from flapping around in windy conditions. However, the prior canopy mechanism lacks the ability to apply a positive tensioning force toward the extended position to stretch the canopy to its fully extended position. That is, the ratcheting mechanism only provides a predetermined positive engaging positions. If the ratcheting position does not perfectly align with the position where the canopy is fully extended, sagging can result.

SUMMARY OF THE INVENTION

The present invention relates to a stroller, in particular a tandem seat stroller, and a unique canopy mechanism and a unique reclining mechanism for use in the stroller according to the present invention. The stroller comprises a main frame having a first seat support for supporting a first seat and a first reclinable backrest frame for supporting a first backrest. A first reclining mechanism is connected to the backrest frame and the main frame for selectively pivotally moving the backrest relative to the main frame, which includes at least one pivot mechanism. A first canopy mechanism is also connected to the main frame which includes a first tensioning mechanism, a first canopy frame connected to one end of a canopy and a second canopy frame connected to the other end of the canopy.

The stroller can further include a canopy mounting member for removably connecting the canopy mechanism to the main frame. This enables the entire canopy to detach from the stroller when not needed. Further, the main frame of the stroller is foldable. In this regard, the canopy mounting member can also be pivotally connected to the main frame such that the canopy can be automatically closed and pivoted away in a stow away position when the main frame is folded.

The first reclining mechanism preferably includes a substantially identical right and left pair of pivot mechanisms for reclining the backrest. An actuator is connected to both of the pivot mechanisms for substantially simultaneously actuating the same. Similarly, the canopy mechanism preferably includes a substantially identical right and left pair of tensioning mechanisms to evenly and smoothly move the canopy.

The main frame of the stroller can further include a second seat support for supporting a second seat and a second reclinable backrest frame connected to the main frame for supporting a second backrest, thus capable of seating two infants, i.e., a tandem stroller. In this regard, the second backrest can also include a second reclining mechanism having a substantially identical right and left pair of pivot mechanisms for reclining the second backrest, which is substantially similar to the first reclining mechanism. Likewise, a second canopy mechanism having a substantially identical right and left pair of tensioning mechanism, which is substantially similar to the first canopy mechanism and can also be included in association with the second seat.

Specifically, the reclining mechanism according to the present invention includes at least one pivot member which comprises a first pivot mechanism member for connecting to the frame and a second pivot mechanism member connecting to the backrest frame to the backrest. The second member is pivotably and displaceably connected relative to the first member to permit the backrest frame to be selectively angled relative to the main frame. One of the first and second members includes an abutment member and the other of the first and second members includes a plurality of complementary abutment notches to which the abutment member can engage and be positioned thereabout. The notches define at least two tilt positions for the backrest. A spring is operatively connected to the first and second members to permit the abutment member to be biased against one of the notches.

Preferably, the abutment member is formed on the first member and the complementary notches formed on the second member. The abutment notches are one-way ratchet teeth type which permit the abutment member to slip relative to the notches in one direction to enable the backrest to pivot forward upon being pushed or pulled forward. However, the notches prevent the abutment member from pivoting rearward, in the other direction, to prevent the backrest from pivoting rearward. In this regard, to prevent the backrest from pivoting forward in a certain position, the first member includes a lock. Specifically, the lock comprises an abutment wall formed adjacent to one or more of the teeth or notches which prevents the abutment member from slipping out of that notch.

An abutment releasing member such as a wire is connected to the second member so that the second member can be displaceably moved relative to the first member to clear the teeth. Once the teeth are cleared, the second member is free to pivot relative to first member to enable the second member to pivot the backrest either forward or rearward.

The second member has a substantially longitudinal body with a longitudinal guide slot. The first member includes a guide traversing into the slot to limit the longitudinal displacement of the second member within the bound of the slot. The second member has a longitudinal chamber extending substantially parallel with the slot from one end thereof toward the other end, the slot coexisting with a portion of the chamber. The end (bottom) is closed, with the abutment member formed thereabout. The spring is positioned within the chamber between the guide and the bottom end.

The abutment member can have one or more teeth which is complementary with the teeth formed on the first member. In one embodiment, the abutment member has one tooth and the first member has three teeth defining three different positions for the second member. In another embodiment, the abutment member includes a pair of teeth which are complementary to any two adjacent teeth formed on the fixed member and the first member has five teeth defining four different positions for the second member.

According to another aspect of the present invention, the canopy tensioning mechanism comprises a first pivot body for connecting to a frame of the stroller and a second pivot body for connecting to a canopy member which is connected to a canopy. The second body is rotatably connected to the first body to permit the canopy member to rotate from a closed position where the canopy is closed to an open position where the canopy is extended open. The tensioning mechanism is provided with a torquing means for torquing the second body toward the open position relative to the first body to tension the canopy toward the open position when the second body is pivoted to open the canopy.

Specifically, one of the first and second bodies includes at least one protruding member and the other of the first and second bodies includes at least first and second spaced apart positioning lands and a tooth having a pair of first and second opposed sloped portions formed between each adjacent pair of the positioning lands. The first sloped portion is positioned contiguous with the first land and the second sloped portion is positioned contiguous with the second land. The protruding member engages the first land when the canopy is closed and engages the second sloped portion that is further away from the first land when the canopy is opened. Preferably, the protruding member is formed on the first body and the tooth is formed on the second body.

Specifically, the torquing means comprises a spring which is operatively connected to the first and second bodies to bias the first and second bodies toward each other with the protruding member facing the tooth and the second sloped portion. Since the protruding member is positioned on the second sloped portion which is sloped toward the second land and the spring biases the first and second bodies toward each other, the second body is biased to rotate toward the second land, thus enabling the second body to tension the canopy.

More specifically, each tooth has a truncated triangular or trapezoidal shaped profile, with a substantially flat peak surface portion formed contiguous with and between the first and second sloped portions. The first sloped portion and the second sloped portions can have different slopes, preferably with the second sloped portion having a steeper slope than the first sloped portion. However, the first sloped portion can have a steeper slope than the second sloped portion as well. The second sloped portion has a slope that permits the second body to rotatably bias toward the second land upon the protruding member engaging the second sloped portion.

According to one embodiment of the present invention, the first body has five radially extending, equally spaced protruding members and the second body has five radially extending positioning lands, with the tooth axially extending between adjacent lands, providing about 72° between the lands. Alternatively, a smaller angle between the lands can be provided. For example, the first body can have six radially extending, equally spaced protruding members and the second body has six radially extending positioning lands, with the tooth axially extending between adjacent lands. This provides about 60° between the lands. Any desired gap between the lands thus can be created according to the present invention.

BRIEF DESCRIPTION OF THE DRAWINGS

These and other features, aspects, and advantages of the present invention will become much more apparent from the following description, appended claims, and accompanying drawings, in which:

DETAILED DESCRIPTION OF THE DRAWINGS

Figures 1, 2C:
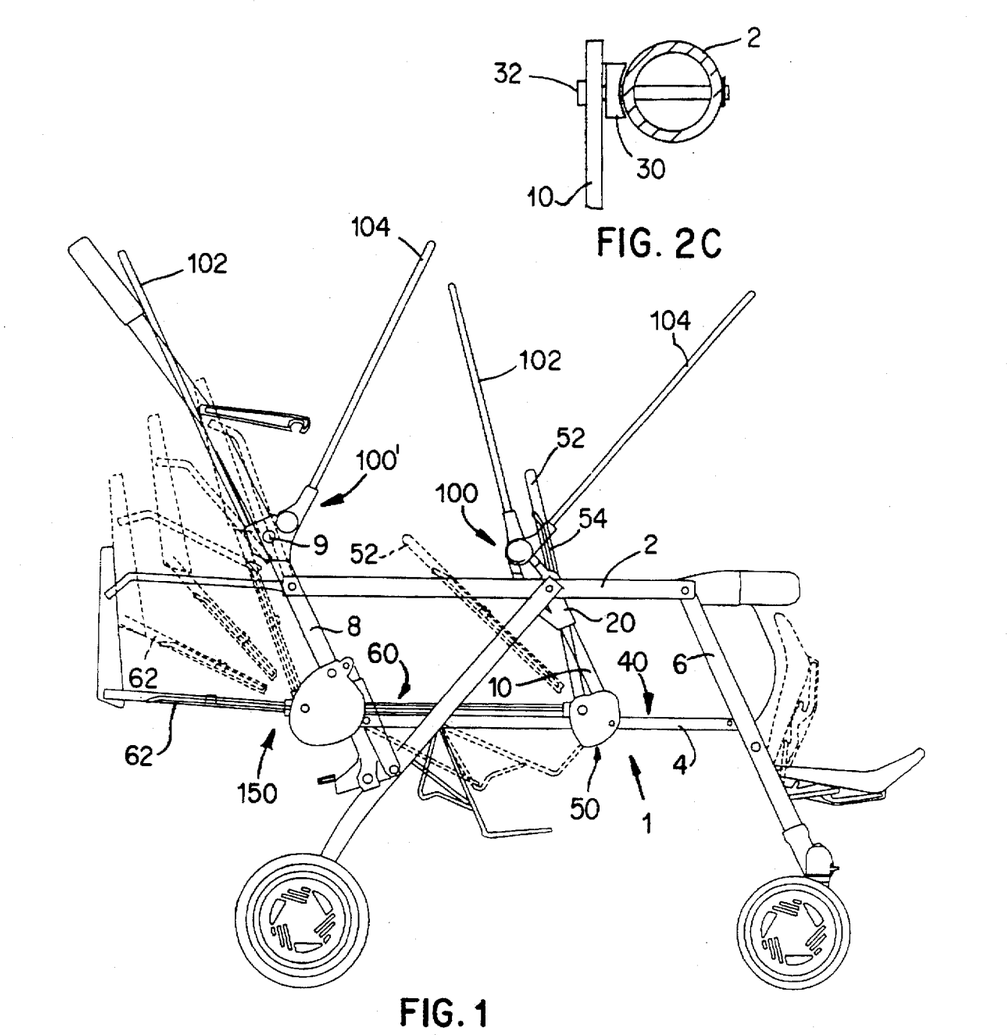
FIG. 1 shows a schematic side view of a stroller according to the present invention.
FIG. 2C is a detailed view of the stroller frame connection.

FIG. 1 shows a tandem stroller with the fabric removed to reveal the main frame 1 thereof. A tandem stroller having a frame similar to the frame shown is sold by GRACO® under the name of DUO®, Series 7900, as shown in GRACO®'s 1993 catalog. Similar to the tandem stroller shown in FIG. 1, the tandem strollers shown in the GRACO® 1993 catalog also each have a substantially parallelogram shaped main frame 1 defined by a pair of upper and lower horizontal frame members 2 and 4, and a substantially parallel front and rear frame members 6 and 8. The ends portions of the frame members 2, 4, 6, and 8 are operatively pivotally coupled as shown in FIG. 1, which permit the frame members to be folded. It is to be understood that only the right side has been described, the left side being a mirror image of the right side.

Figure 2A:
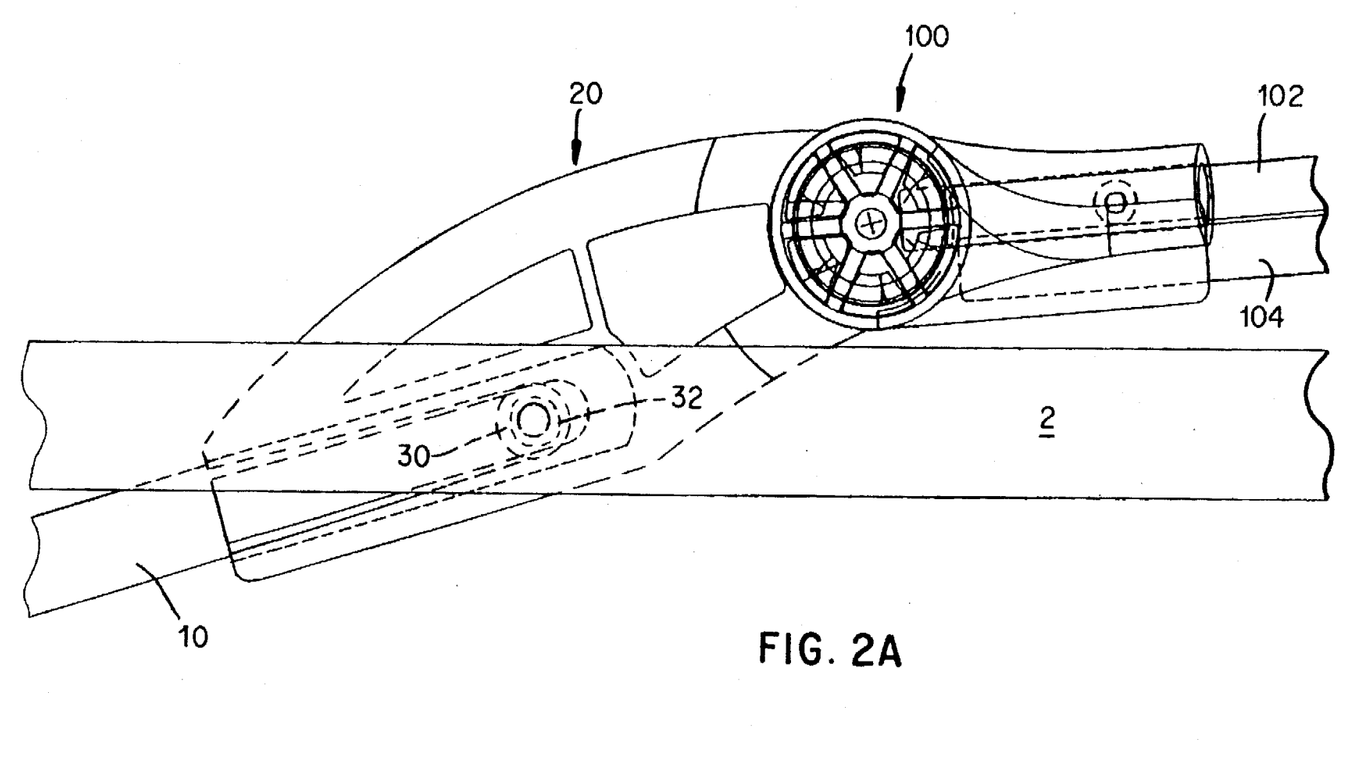
FIGS. 2A and 2B show a canopy mounting member and a canopy mechanism.

A stroller according to the present invention further includes a canopy collapsing frame member 10 connected to a canopy mounting member 20. The frame member 10 is pivotally connected to the upper and lower frame members 2 and 4 such that when the main frame is folded, the frame member assumes the position shown in FIG. 2A. As the canopy mounting member 20 is connected, preferably removably as described hereinbelow, to the frame member 10, it too pivots along with the frame member 10, thus causing the canopy connected thereto close as shown in FIG. 2A. Specifically, even if the canopy is in its open position, as the canopy mounting member 20 pivots forward to the position shown in FIG. 2A, the canopy holding movable frame member 104 abuts against the upper frame member 2 or other portions of the frame while the fixed canopy frame member 102 pivots toward the movable frame member to close the canopy. Accordingly, the canopy is automatically closed and pivoted away in a stow away position as shown in FIG. 2A when the main frame is folded.

Figure 2B:
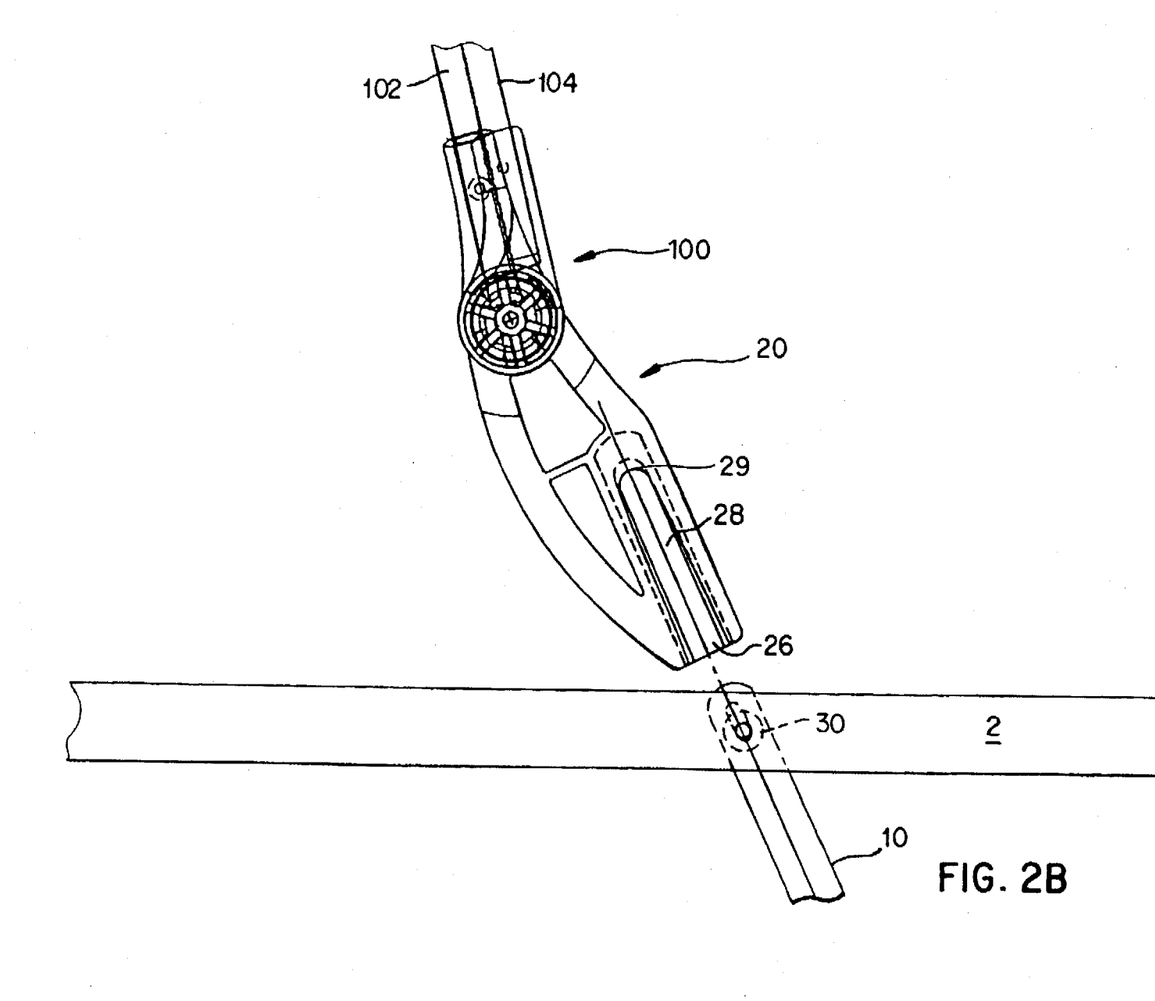

The canopy mounting member 20 is detachably connected to the frame member 10 to enable the entire canopy assembly, including the canopy mechanism 100 to be detached from stroller when not needed. Specifically, as shown in FIG. 2B, the mounting member 20 includes a socket 26 dimensioned to frictionally engage the end portion of the frame 10. The socket is provided with a pair of slots 28 and 29 to permit the mounting member to be inserted to end portion of the frame 10. FIG. 2C shows the connection between the frame member 10 and the upper frame 2. Specifically, a washer or the like member 30 is positioned between the upper frame and the frame 10 to provide a gap to permit insertion of the mounting member 20. The slot 28 is dimensioned to slide relative to the washer 30 and the slot 29 is dimensioned to clear the connecting member 32.

The stroller shown in FIG. 1 further includes a first seat support portion 40 for supporting a first seat (not shown) and a first reclinable backrest frame 52 for supporting a first backrest (not shown). A first reclining mechanism 50 is connected to the backrest frame 52 and the main frame for selectively pivotally moving the backrest relative to the main frame, which includes a substantially identical right and left pair of pivot mechanisms 50 (right pivot mechanism shown) and a pivot actuator 54 is connected to both of the pivot mechanisms for substantially simultaneously actuating the same, which is described hereinbelow in detail. A first canopy mechanism 100 preferably includes a substantially identical right and left pair of tensioning mechanisms 110 (see FIG. 3) to evenly and smoothly move the canopy, the first canopy frame 102 connected to one end of a canopy (not shown) and a second canopy frame 104 connected to the other end of the canopy.

The main frame of the stroller includes a second seat support 60 for supporting a second seat (not shown) and a second reclinable backrest frame 62 connected to the main frame for supporting a second backrest (not shown), thus capable of seating two infants, i.e., a tandem stroller. In this regard, the second backrest can also include a second reclining mechanism 150 having a substantially identical right and left pair of pivot mechanisms for reclining the second backrest, which is substantially similar to the first reclining mechanism 50. Likewise, a second canopy mechanism 100' having a substantially identical right and left pair of tensioning mechanisms 110, which is substantially similar to the first canopy mechanism 100 can also be included in association with the second seat.

Figure 3:
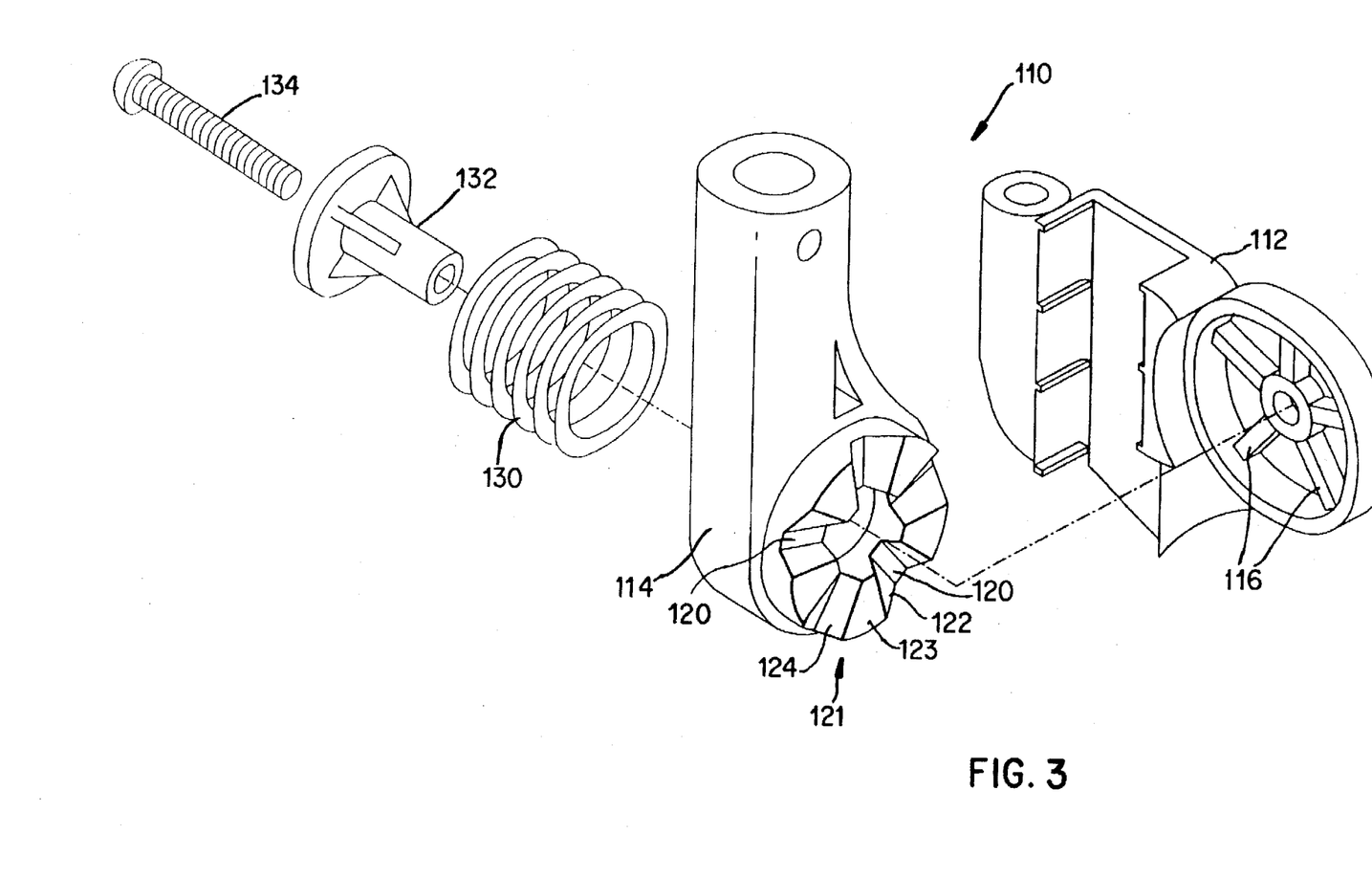
FIG. 3 shows an exploded perspective view of a tensioning mechanism according to the present invention for connecting a canopy to the stroller.
Figure 4:
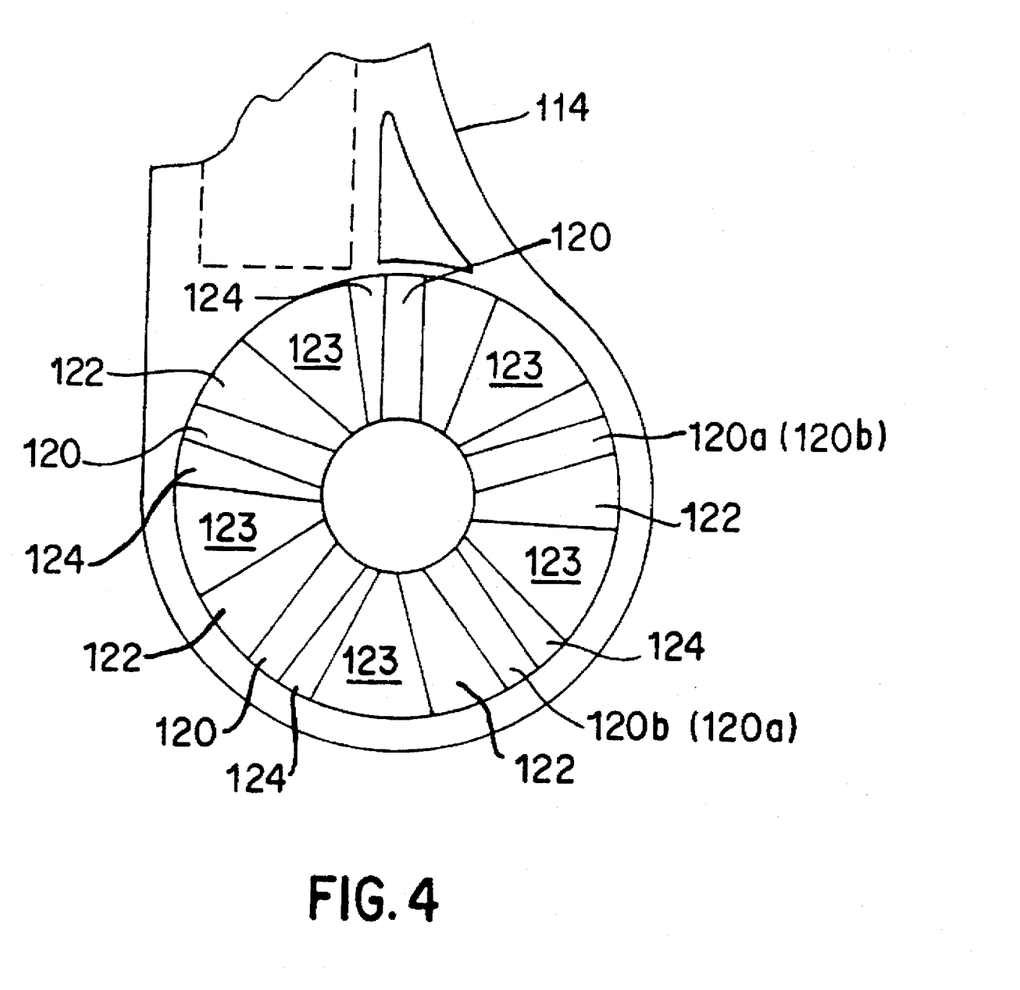
FIG. 4 is a front view of the first pivot body of the tensioning mechanism shown in FIG. 3.
Figure 5:
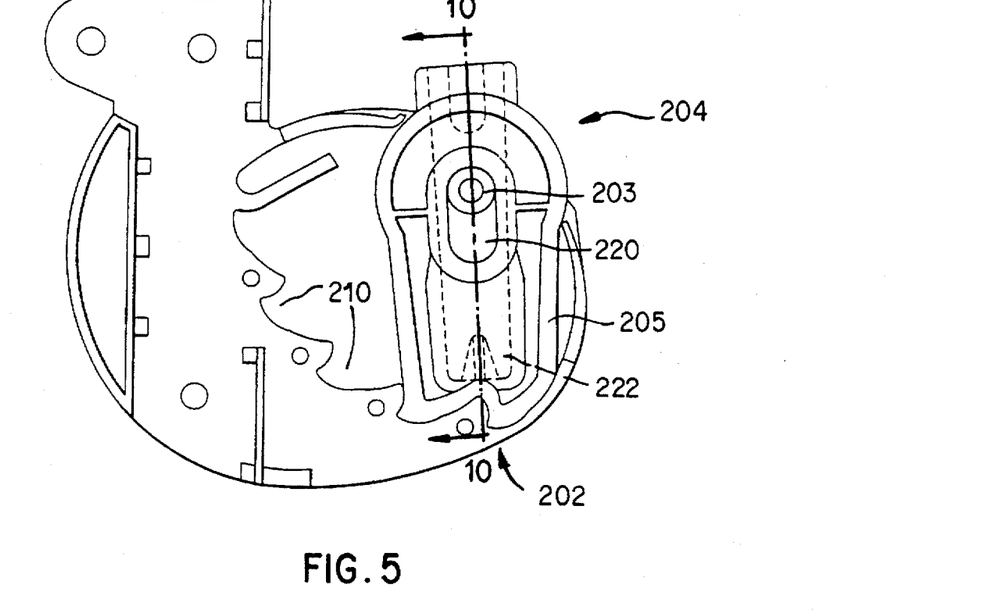
FIGS. 5 to 8 show plane views of one embodiment of a reclining mechanism according to the present invention in various positions.

As shown in FIG. 3, each of the canopy tensioning mechanisms 110 includes a first pivot body 112 for connecting to the frame of the stroller and to the first canopy frame 102, and a second pivot body 114 for connecting to the second canopy frame 104. It should be noted that FIG. 3 is a particular embodiment of the canopy tensioning mechanism adopted to be connected to the back seat, rear right side of the frame. The operating mechanism however is substantially identical for the all four canopy tensioning mechanisms, the left side canopy tensioning mechanism being a mirror image of the right side canopy tensioning mechanism. Accordingly, only one of these tensioning mechanisms is shown and discussed in detail.

The second body 114 is rotatably connected to the first body 112 to permit the second canopy frame 104 to rotate from a closed position where the canopy is closed to an open position where the canopy is extended open and vice-versa. FIG. 1 shows the second canopy 104 in the open position. The tensioning mechanism 110 is provided with a torquing means for torquing the second body 114 toward the open position as shown in FIG. 1 relative to the first body 112 to tension the canopy toward the open position when the second body is pivoted to open the canopy.

Specifically, the first body 114 includes at least one protruding member 116 and the second movable body 114 includes at least two, first and second spaced apart positioning lands 120 and a tooth 121 having a pair of first (leading) 122 and second (trailing) 124 opposed sloped portions formed between each adjacent pair of the positioning lands. As shown in FIG. 3, the first body 112 preferably has five radially extending, equally spaced protruding members 116 and the second body 114 has five equally spaced, radially extending positioning lands 120, with the tooth axially extending between the adjacent lands 120, providing about 72° between the lands. Although the drawings only show one embodiment, a smaller angle between the lands can be provide. For example, the first body 112 can have six radially extending, equally spaced protruding members 116 and the second body 114 can have six radially extending positioning lands 120, with the tooth axially extending between the adjacent lands. This provides about 60° between the lands. Any desired gap between the lands thus can be created according to the present invention. Thus, if it is desired, the front canopy mechanism can be provided with the 60° spacing and the rear canopy mechanism can be provided with 72° spacing, 72° degree mechanism capable of moving a longer canopy.

Each of the first leading sloped portion 122 is positioned contiguous with the first land 120a (120b) and the second sloped portion 124 is positioned contiguous with the second land 120b (120a). Each of the protruding members engages one of the lands 120 when the canopy is closed and engages the second sloped portion 124 that is further away from the first leading land 120a (trailing 120b) when the canopy is opened. Although the protruding members 116 are formed on the first body and the teeth 121 are formed on the second body, they could be reversed.

Specifically, the torquing means comprises a spring 130 which is operatively connected to the first and second bodies to bias the first and second bodies toward each other with the protruding members 116 facing the teeth 121, and the second sloped portion 124. Since the protruding member is positioned on the second sloped portion 124 which is sloped toward the second land and the spring biases the first and second bodies toward each other, the second body 114 is biased to rotate toward the second land 120b which is adjacent the trailing sloped portion 124, thus enabling the second body to tension the canopy. A spring retainer 132 such as shown in FIG. 3 can be used to retain the spring between a recess (not shown) in the second body 114. A screw 134 or the like can be used to connect the first body to hold the retainer 132 in place. The spring thus brings first and second bodies 112 and 114 toward each other.

Each tooth has a truncated triangular or trapezoidal shaped profile, with a substantially flat peak surface portion 123 formed contiguous with and between the first and second sloped portions 122 and 124. The first sloped portion and the second sloped portions 122 and 124 can have different slopes as shown, preferably with the second sloped portion having a steeper slope than the first sloped portion. However, the first sloped portion can have a steeper slope than the second sloped portion if desired. The second sloped portion has a slope that permits the second body to rotatably bias toward the second land upon the protruding member engaging the second sloped portion. The sloped portions 122 and 124 can also be curved (convex) if desired to modify the torque produced. The slopes can also be modified in other ways as needed.

When the canopy is opened, the shallower leading sloped portion 122 is first engaged. Since the angle is shallower than the trailing leading sloped portion 124, it requires less force to open the canopy than to close the canopy since the leading sloped portion 124 is first engaged. As the protrusion members 116 moves upwardly toward the leading sloped portion 122, the spring is further compressed until the protrusion members 116 engage the flat peak portion 123. When the protrusion members engage the trailing sloped portions as the second body rotates, the compression force of spring is released and biases the second body to further rotate toward the second land 120b and no additional force is necessary to position the canopy in its open position. In this regard, even when the canopy is not exactly cut, or deviated due to manufacturing tolerances, the second sloped portion 124 provides an ample latitude to "pop" open and tension the canopy to reduce sag. Once the canopy is in the open position, it will stay in this position until a larger closing force is applied.

For the front canopy, a first body 112 similar to the one shown is preferably attached to the canopy mounting member as shown in FIG. 1 and 2A, 2B such that the entire right and left canopy tensioning mechanisms can be removed along with the canopy. The first body shown in FIG. 3 is removably mounted to the rear frame 8. Specifically, 2A, the first body 112 can include a pear shaped connection opening (not shown) having a larger opening contiguous with a smaller opening which is connected to a pin 9 having an enlarged head connected to the frame 8. The first body is first moved up relative to the pin so that the pin is aligned with the larger opening. The first body can then move laterally to clear the pin.

The reclining mechanism 50 and 150 according to the present invention includes at least one pivot member 200, which comprises a first pivot mechanism member 202 for connecting to the stroller frame and a second pivot mechanism member 204 connecting to the backrest frame 52, 62. It should be noted that the embodiment shown in FIGS. 5–9 is particularly adopted for the rear seat. The operating mechanism however is substantially identical for the all four canopy tensioning mechanisms, the left side canopy tensioning mechanism being a mirror image of the right side canopy tensioning mechanism. Accordingly, only one of these tensioning mechanisms is shown and discussed in detail.

Figures 10, 11:
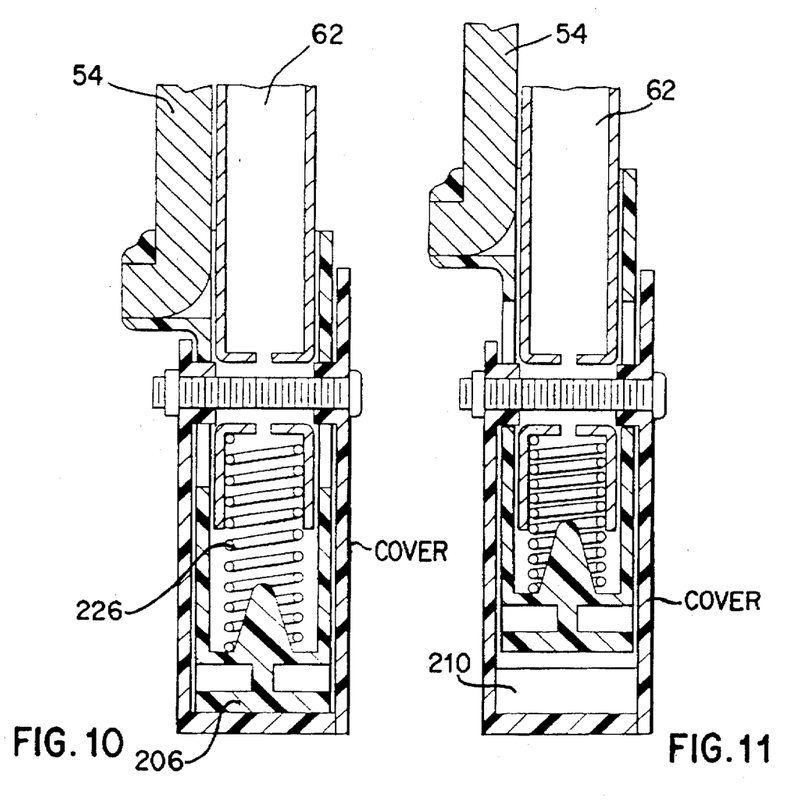
FIG. 10 is a cross-section of the second member of the reclining mechanism taken along line 10—10 of FIG. 5.
FIG. 11 is a cross-section of the second member of the reclining mechanism taken along line 11—11 of FIG. 6.

The second member 204 is pivotably and displaceably connected relative to the first member 202 to permit the backrest frame 52, 62 to be selectively angled relative to the main frame. The second member 204 includes an abutment member 206 and the other of the first and second members includes a plurality of complementary abutment notches 210 to which the abutment member 206 can engage and be positioned thereabout. The notches 210 define at least two tilt positions for the backrest. As shown in FIG. 10 and 11, the spring 226 is operatively connected to the first and second members 202 and 204 to permit the abutment member 206 to be biased against one of the notches 210.

Figure 9:
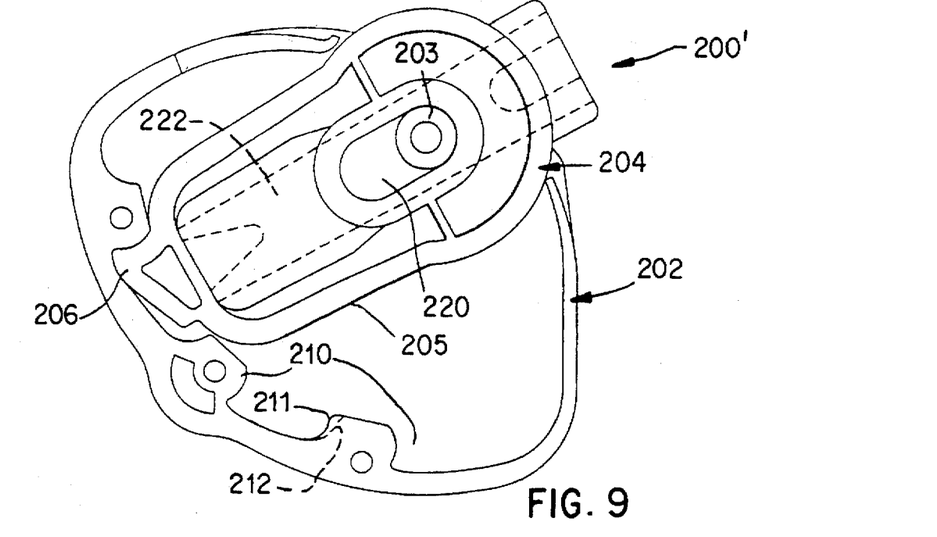
FIG. 9 shown another embodiment of the reclining mechanism according to the present invention.

The abutment notches 210 are one-way ratchet teeth type which permit the abutment member 206 to slip relative to the notches in one direction to enable the backrest frame 52, 62 to pivot forward upon being pushed or pulled forward. However, the notches prevent the abutment member from pivoting rearward, in the other direction, to prevent the backrest from pivoting rearward. In this regard, to prevent the backrest from pivoting forward in a certain position as shown in FIG. 9, the first member 202 includes a lock. Specifically, the lock comprises an abutment wall 211 formed adjacent one or more of the teeth or notches which prevents the abutment member from slipping out of that notch. The line 212 in phantom shows the position of the wall if the locking member is not present so as to permit the blocking member to clear the wall.

Figure 6:
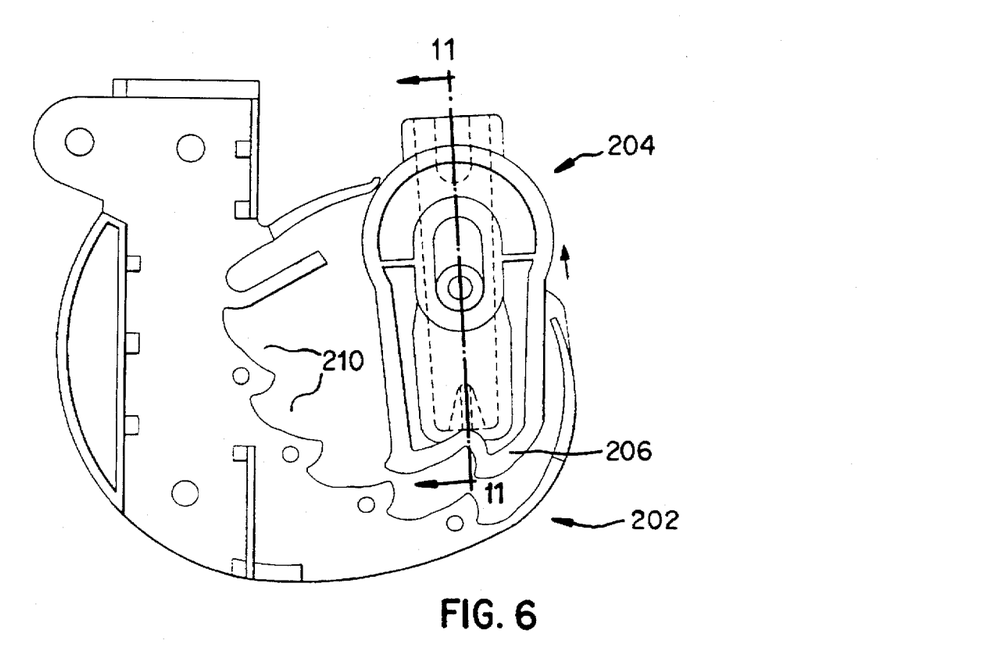
Figure 7:
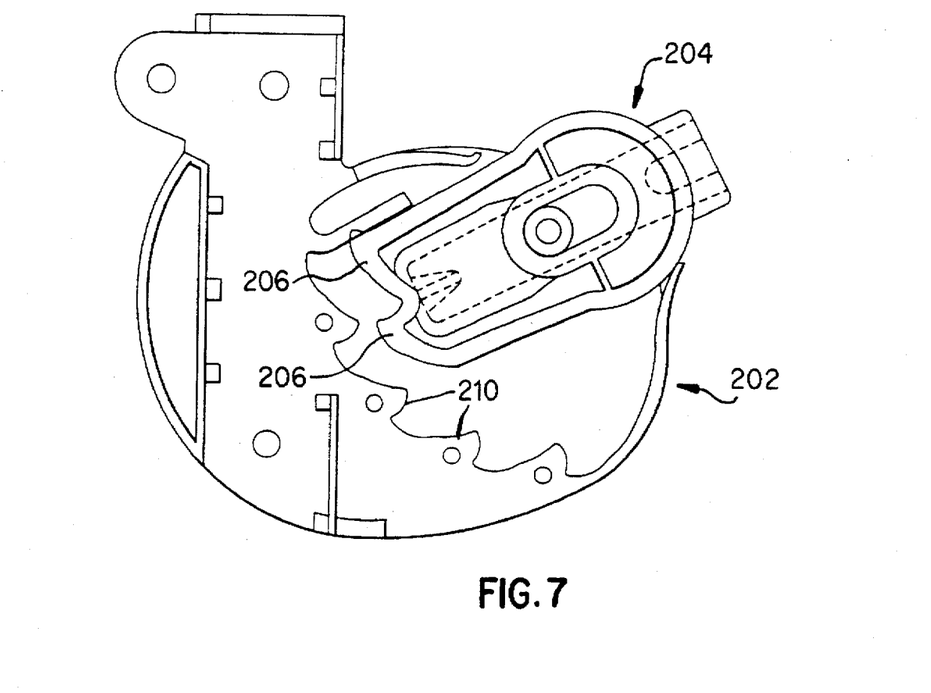
Figure 8:
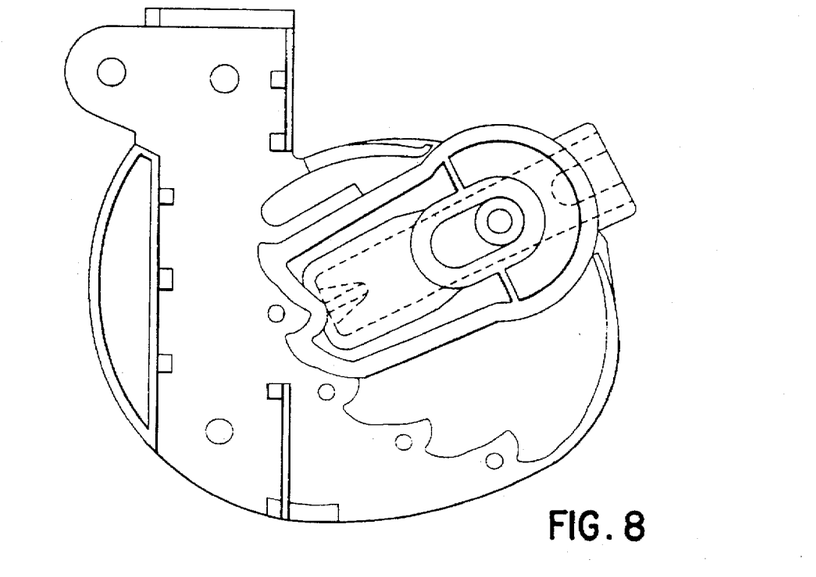

An abutment releasing actuating member 54 (see FIG. 1) such as a wire is connected to the second member so that the second member 204 can be displaceably moved relative to the first member 202 to clear the teeth. Once the teeth are cleared, the second member is free to pivot relative to first member to enable the second member to pivot the backrest either forward or rearward as shown in FIGS. 6 and 7.

The second member 204 has a substantially longitudinal body 205 with a longitudinal guide slot 220. The first member 202 includes a guide 203 traversing into the slot to limit the longitudinal displacement of the second member within the bounds of the slot. The second member has a longitudinal chamber 222 extending substantially parallel with the slot from one end thereof toward the other end, the slot coexisting with a portion of the chamber. The end (bottom) is closed, with the abutment member formed thereabout. A spring 226 is positioned within the chamber between the guide and the bottom end. As shown in FIGS. 10 and 11, by pulling the member 54, the second member 204 is displaced upwardly to clear the teeth.

The abutment member can have one or more teeth which is complementary with the teeth formed on the first member. In one embodiment shown in FIG. 9, the abutment member has one tooth and the first member has three teeth defining three different positions for the second member. In another embodiment as shown in FIGS. 5–9, the abutment member includes a pair of teeth which are complementary to any two adjacent teeth formed on the fixed member and the first member has five teeth defining four different positions for the second member.

The foregoing description is only illustrative of the principle of the present invention. It is to be recognized and understood that the invention is not to be limited to the exact configuration as illustrated and described herein. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A reclining mechanism for reclining a seat backrest of a stroller comprising:

a first pivot member for connecting to a frame of the stroller;

a second pivot member for connecting to the backrest, wherein the second pivot member is pivotably and displaceably connected to the first pivot member to selectively position the backrest relative to the frame;

the second pivot member includes an abutment member adapted to engage one of a plurality of complementary abutment notches on the first pivot member, a portion of the abutment member having a first shape, and a portion of the abutment notch having a second shape generally corresponding to the first shape to allow the abutment notch to receive the abutment member;

a spring connected to the first and second pivot members to urge the abutment member toward one of the abutment notches; and the abutment member including a first forward surface and a second rearward surface, the first forward surface being shaped differently than the second rearward surface, the first and second surfaces enabling the backrest to pivot in a first direction but preventing the backrest from pivoting in the other direction when the abutment member is engaged with one of the abutment notches.

2. A reclining mechanism according to claim 1, wherein the abutment member includes at least one ratchet tooth.

3. A reclining mechanism according to claim 2, wherein the first pivot member includes a locking portion to prevent the second member from rotating in the first direction.

4. A reclining mechanism according to claim 3, wherein the locking portion includes an abutment wall formed adjacent the ratchet tooth.

5. A reclining mechanism according to claim 1, further comprising an abutment releasing member connected to the second member for pulling the second member away from the first member to enable the second member to rotate in the other direction to pivot the backrest rearward.

6. A reclining mechanism according to claim 1, wherein the abutment member includes a tooth which is complementary to any tooth formed on the first member, the first member including three teeth defining three different positions for the second member.

7. A reclining mechanism according to claim 1, wherein the abutment member includes a pair of engaging teeth which are complementary to any two adjacent teeth formed on the member, the first member having five teeth defining four different positions for the second member.

8. A reclining mechanism for reclining a seat backrest of a stroller comprising:

a first pivot member for connecting to a frame of the stroller;

a second pivot member for connecting to the backrest, wherein the second pivot member is pivotably and displaceably connected to the first pivot member to selectively position the backrest relative to the frame;

the second pivot member includes an abutment member adapted to engage one of a plurality of complementary abutment notches on the first pivot member, a spring connected to the first and second pivot members to urge the abutment member toward one of the abutment notches;

wherein the second member has a longitudinal slot defining a longitudinal direction, and the first member includes a guide disposed in the slot;

wherein the second member is movable with respect to the first member along the longitudinal direction of the slot; and the second member includes a chamber, the abutment member being formed adjacent one end of the chamber, the spring being positioned substantially within the chamber.

9. A reclining mechanism according to claim 8, wherein the abutment member includes a tooth which is complementary to any one of the teeth formed on the first member, the first member having three teeth defining three different positions for the second member.

10. A reclining mechanism according to claim 8, wherein the abutment member includes a pair of engaging teeth which are complementary to any two adjacent teeth formed on the fixed member, the first member having five teeth defining four different positions for the second member.

11. A reclining mechanism for reclining a seat backrest of a stroller comprising:

a first pivot member for connecting to a frame of the stroller;

a second pivot member for connecting to the backrest, wherein the second pivot member is pivotably and displaceably connected to the first pivot member about a pivot guide to selectively position the backrest relative to the frame, the backrest being located on a first side of the pivot guide;

the second pivot member includes an abutment member adapted to engage one of a plurality of complementary abutment notches on the first pivot member, the abutment member disposed on a second side of the pivot guide opposite to the first side, a portion of the abutment member having a first shape, and a portion of the abutment notch having a second shape generally corresponding to the first shape to allow the abutment notch to receive the abutment member;

a spring connected to the first and second pivot members to urge the abutment member toward one of the abutment notches; and the abutment member including a first forward surface and a second rearward surface, the first forward surface being shaped differently than the second rearward surface, the first and second surfaces enabling the backrest to pivot in a first direction but preventing the backrest from pivoting in the other direction when the abutment member is engaged with one of the abutment notches.

12. A reclining mechanism according to claim 11, wherein the abutment member includes at least one ratchet tooth.

13. A reclining mechanism according to claim 12, wherein the first pivot member includes a locking portion to prevent the second member from rotating in the first direction.

14. A reclining mechanism according to claim 13, wherein the locking portion includes an abutment wall formed adjacent the ratchet tooth.

15. A reclining mechanism according to claim 11, further comprising an abutment releasing member connected to the second member for pulling the second member away from the first member to enable the second member to rotate in the other direction to pivot the backrest rearward.

16. A reclining mechanism according to claim 11, wherein the abutment member includes a tooth which is complementary to any tooth formed on the first member, the first member including three teeth defining three different positions for the second member.

17. A reclining mechanism according to claim 11, wherein the abutment member includes a pair of engaging teeth which are complementary to any two adjacent teeth formed on the member, the first member having five teeth defining four different positions for the second member.

18. A reclining mechanism according to claim 11, wherein the second member has a longitudinal slot defining a longitudinal direction, and the first member includes a guide disposed in the slot;

wherein the second member is movable with respect to the first member along the longitudinal direction of the slot; and the second member includes a chamber, the abutment member being formed adjacent one end of the chamber, the spring being positioned substantially within the chamber.

19. A reclining mechanism according to claim 11, wherein the abutment member is substantially aligned with the backrest.

* * * * *